J. HINEMAN.
LAWN MOWER SHARPENER.
APPLICATION FILED FEB. 12, 1914.

1,103,584.

Patented July 14, 1914.

Witnesses:
W. R. Alexander
J. E. Coon

Inventor
John Hineman
By J. M. St. John
Atty

UNITED STATES PATENT OFFICE.

JOHN HINEMAN, OF CEDAR RAPIDS, IOWA.

LAWN-MOWER SHARPENER.

1,103,584.  Specification of Letters Patent.  Patented July 14, 1914.

Application filed February 12, 1914. Serial No. 818,268.

*To all whom it may concern:*

Be it known that I, JOHN HINEMAN, a citizen of the United States, residing at Cedar Rapids, in the county of Linn and State of Iowa, have invented certain new and useful Improvements in Lawn-Mower Sharpeners, of which the following is a specification.

This invention relates to devices for sharpening the rotary knives of lawn mowers; and the object of the invention is to produce a sharpening device of simple construction adapted to be easily and quickly attached to a lawn mower, and to sharpen the same by rotating the mower, as in mowing, except that the mower is drawn instead of being pushed.

The nature of the invention is fully set forth in the description and claim following, reference being had to the accompanying drawing, in which—

Figure 1:
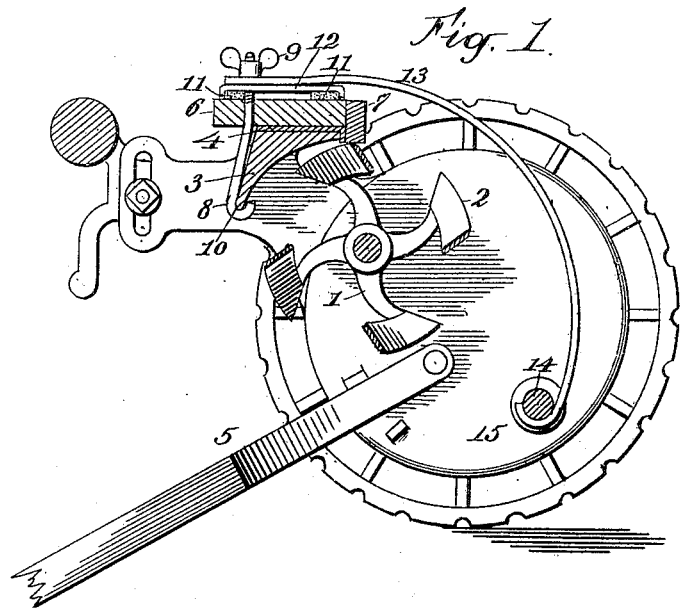
Figure 2:
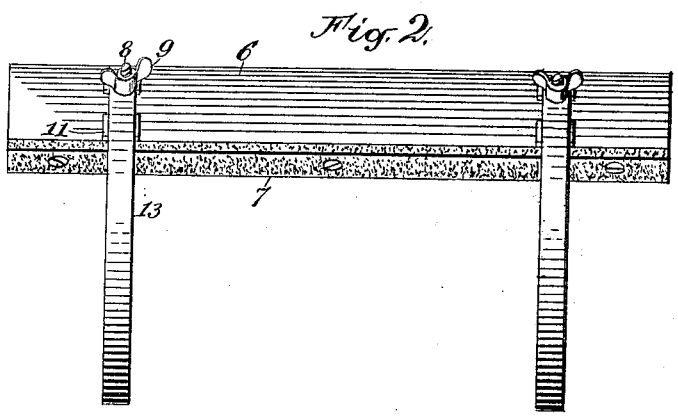

Figure 1 is a cross-section of the sharpening device as applied to a mower. Fig. 2 is a rear view of the same detached.

Referring to the drawing, 1 denotes the rotary cutter-head of a lawn mower, provided with curved blades 2. To the cross-bar 3 of the main frame is attached the ledger-blade 4, with which the rotary cutter coöperates. In Fig. 1 the handle 5 is shown depressed, merely for convenience in drawing and illustrating the device, but it will be understood that in actual use the handle is turned up to the regular working angle, but with the mower inverted, and is thus drawn along the ground.

To a block 6, which may be of wood or metal, is attached, as by screws, a slab of suitable abrasive material, preferably carborundum, with a straight lower edge. This straight, grinding edge of the slab 7, as will be seen, depends far enough below the block so as to be slightly lower than the cutting edge of the ledger-blade, the difference, in practice, being hardly appreciable, however, as the grinding is done without any change in adjustment of the cutting apparatus, except the slight adjustment necessary after the grinding is finished.

Through the block passes a pair of hook-bolts 8, provided with thumb-nuts 9. The hooks of the bolts engage the flange 10 of the cross-bar 3, and hold this side of the block securely in position. In practice this holding of the bar is not made perfectly rigid, however, since the grinding slab should yield slightly in the act of grinding. This slight elasticity is secured by the interposition of a yielding material, preferably sheets of rubber 11 between the block and the thumb-nuts. It is preferred to mount a pair of metal strips 12 over the elastic shims 11, as shown. Between these shims and the thumb-nuts are interposed the holders for the grinder side of the block, a pair of curved, and slightly flexible hooks 13, the hooked ends of which engage the cross-rod 14 connecting the gear-cases 15 at opposite ends of the mower. It will be seen that a slight tightening of the thumb-screws will have the effect of easing off the abrading slab, while a corresponding loosening of the nuts will allow it to go down a trifle, with increased grinding contact.

When in position for grinding, which attachment is the work of but a few moments, the cutters are quickly and accurately ground by simply drawing the mower over the ground. The grinder is as quickly detached, the slight adjustment is made in the pitch of the ledger-blade, and the mower is ready for work with keen and smoothly cutting blades.

Having thus described my invention, I claim:

A grinder for lawn-mowers, comprising a straight-edged abrasive slab, a holder therefor adapted to rest on the ledger-blade of the mower, hook-bolts adapted to clamp said holder in position at one side, and curved, slightly elastic hooks engaging said holder at one end, and at the other end engaging the mower cross-rod.

In testimony whereof I affix my signature in presence of two witnesses.

JOHN HINEMAN.

Witnesses:
WM. E. TREICHLER,
M. L. EBY.

Copies of this patent may be obtained for five cents each, by addressing the "Commissioner of Patents, Washington, D. C."